Nov. 25, 1969 H. A. ENGH ET AL 3,480,743

FACE PANEL FASTENER FOR A TELEPHONE

Filed Dec. 27, 1966 2 Sheets-Sheet 1

INVENTORS
Howard A. Engh
John M. Lord

BY [signature]
Atty.

FACE PANEL FASTENER FOR A TELEPHONE

Filed Dec. 27, 1966

2 Sheets-Sheet 2

INVENTORS
Howard A. Engh
John M. Lord

BY Spencer E. Olson
Atty.

United States Patent Office 3,480,743

Patented Nov. 25, 1969

3,480,743

FACE PANEL FASTENER FOR A TELEPHONE

Howard A. Engh, Franklin Park, and John M. Lord, Park Ridge, Ill., assignors to Automatic Electric Laboratories, Inc., a corporation of Delaware Filed Dec. 27, 1966, Ser. No. 604,908

Int. Cl. H04m *1/00*

U.S. Cl. 179—178 6 Claims

ABSTRACT OF THE DISCLOSURE

A fastener apparatus for releasably attaching a face panel to the housing of a telephone subset. The panel is supported on a recessed shelf in the housing and is retained by a tongue projecting from an edge of the panel into a slot in the side of the housing and by the fastener slidably latched to the shelf through apertures in the panel.

This invention relates generally to telephone substation apparatus and more particularly to the construction of telephone sets and means for attaching a face plate thereto.

Most telephone desk sets currently in use consist of two parts, a base to which the circuit components are attached, and a housing which fits over the components and is secured to the base by screws at the bottom of the telephone. Such telephone sets are manufactured in a limited number of colors. In a pending U.S. design application of G. M. Janda, Ser. No. 2,492 filed May 31, 1966, now abandoned, also assigned to the assignee of the present application, there is disclosed a new telephone design, also primarily consisting of two main parts, but with the housing designed to receive a face panel in the area normally occupied by the dial face. This new design gives a contemporary styling to the telephone, and with only a few basic housing colors together with an assortment of colors and designs for the face panels provides the customer with a wide choice of color combinations to fit the decor of his home or office.

However, for the design to be commercially attractive, and to give the customer the freedom to change face panels at will, it was necessary to provide means for attaching the panel to the housing which would be secure yet readily removable. Moreover, it was essential that the fastening means not detract from the appearance of the design. Previously available fasteners which were externally visible or which consisted of many parts and required special tools for insertion and/or removal were unacceptable.

It is therefore a general object of this invention to provide a fastening means for attaching a face panel to a telephone set.

Another object is to provide a fastener which is easily removable.

Still another object is to provide a fastening means of a simple and economical construction.

A further object is to provide a fastener which does not detract from the appearance of the telephone.

A still further object is to provide a fastener which will also serve as a telephone number card holder, and thereby contribute aesthetically to the general appearance of the telephone.

Briefly, the foregoing objects are obtained by providing the telephone housing with a recessed shelf, in the general area where the dial has previously been located, for supporting the face panel. The face panel is provided with an opening in its surface for receiving a fastener. The fastener is substantially rectangular in its surface dimensions, is formed from a transparent material, and is provided with a slot between its planar surfaces for receiving a telephone number card. The fastener also includes projections at each end, insertable through the opening in the face panel and shaped to engage the shelf of the housing to latch the face panel to the telephone.

A preferred form of the invention will now be described with reference to the accompanying drawings, in which.

Figure 1:
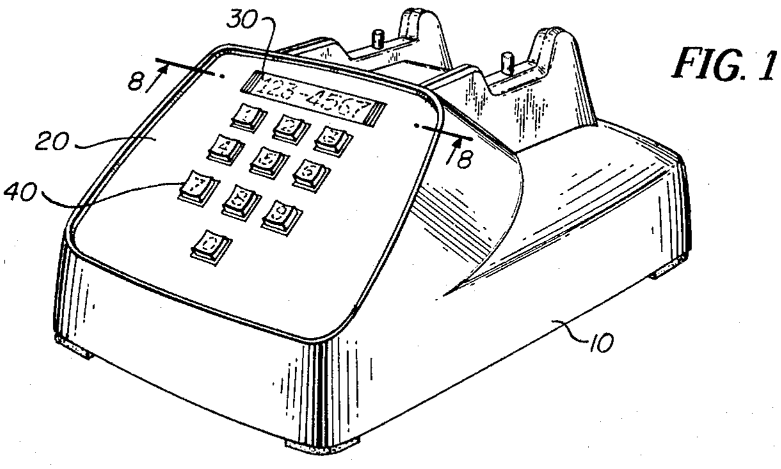
FIG. 1 is a perspective view of a telephone set embodying the features of this invention.

Referring now to the drawings, and in particular to FIG. 1, the telephone set utilizing the present invention, comprises a housing 10 including a cradle for a handset (not shown), a face panel 20, a number card holder 30 and a plurality of push buttons 40. The shell of the housing 10 has a generally rectangular shelf sloping down and away from the cradle towards the front of the set on which the face panel 20 is supported. Panel 20 is formed with a group of apertures therein to allow the push buttons 40 of the signaling device to protrude therethrough, and also has an opening above the apertures in which the number card holder 30 is inserted for engagement with the housing.

Figure 3:
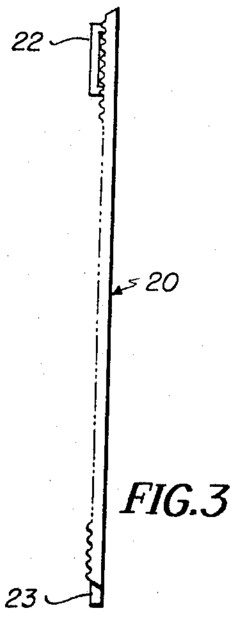
FIG. 3 is an edge view of the face panel of FIG. 2.
Figure 2:
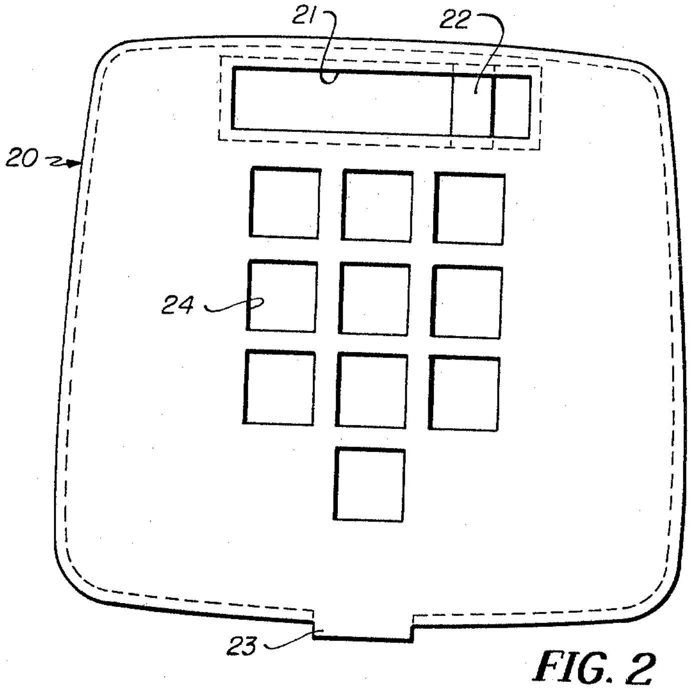
FIG. 2 is a top view of the face panel.

As shown in more detail in FIGS. 2 and 3, the panel 20 in a preferred embodiment is formed of a clear moldable material with a plurality of uniformly spaced decorative ribs on one surface. The desired color of paint is applied to the ribbed surface. A short tongue 23, integral with and lying in the plane of the panel 20, extends from the lower edge of the panel. Substantially in the center of the panel 20 there are a plurality of square apertures 24 for receiving push buttons of the signaling device. Close to the edge opposite that from which the tongue 23 projects the panel is provided with a rectangular opening 21, which is partially closed by a bar 22, molded as an integral part of the panel.

As best seen in FIG. 3, the upper surface of bar 22 is in the same plane as the tips of the ribs. It is to be noted that the bar 22 is positioned in from the right end of aperture 21 so as to effectively provide two apertures of unequal length.

Figure 4:
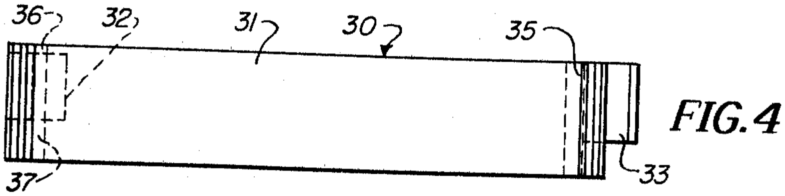
FIG. 4 is a top view of the combination fastener and number card holder.
Figure 5:
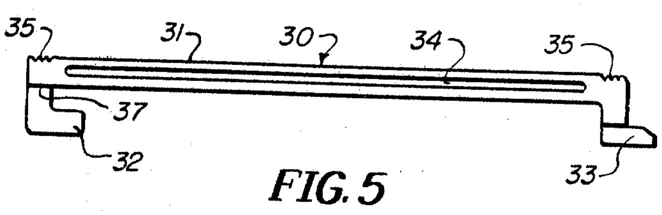
FIG. 5 is a side view of the fastener of FIG. 4.

The combination number card holder and fastener 30 is shown in FIGS. 4 and 5. The holder 30 is formed of a suitable resilient material such as a clear acrylic moldable resin. A slot 34, open at both sides, is provided between the parallel planar top and bottom surfaces into which a rectangular number card may be readily inserted for retention therein. To enhance its decorative appearance and to facilitate frictional engagement by the fingers, the top surface is also provided with a series of transverse grooves 35 at each end. The open sides of the slot facilitate the insertion and removal of a designation or number card, by permitting an existing number card to be pushed out of one side as a new card is pushed in from the other side when the combination number card holder is out of the set. However, when the holder is mounted to the telephone assembly, both sides of the slot are blocked by the panel into which the holder is partially recessed. Also, integrally molded at the bottom, and depending below the surface of the holder, are a pair of foot-like members 32 and 33, one at each end. The toes of both of these members face the same direction with the member 32 being narrower than the width of the holder whereby the bottom surface extends to the end of the holder, creating shoulders 36 and 37.

Figure 6:
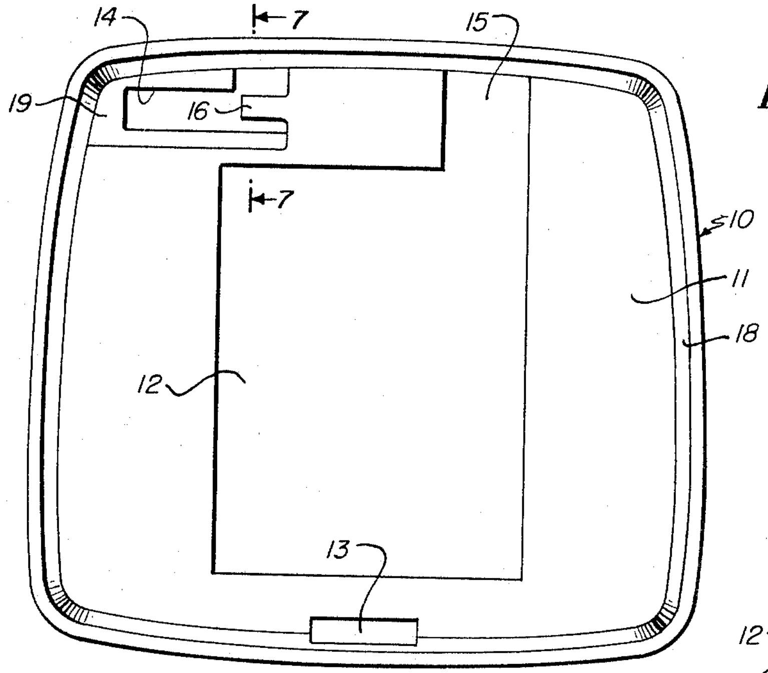
FIG. 6 is a view facing the shelf portion of the telephone housing.
Figure 8:
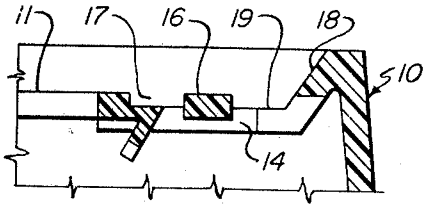
FIG. 8 is a partial sectional view of the telephone housing, through the shelf for supporting the face panel.
Figure 7:
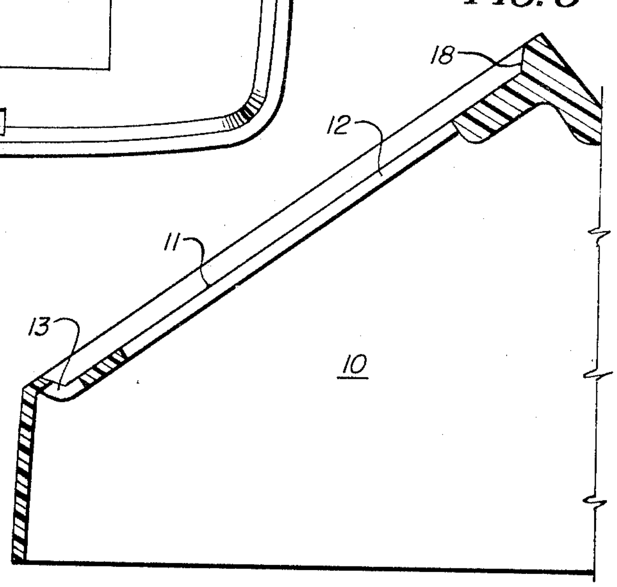
FIG. 7 is a sectional view taken along line 7—7 of FIG. 6.

FIGS. 6, 7 and 8 of the drawings show the front portion of the telephone housing 10, with the panel removed, to reveal the recessed shelf 11. Substantially centrally located in shelf 11 is an opening 12 for accommodating the calling device. Close to the vertical front wall of the housing 10, the well created by the recessed shelf 11 has a slot 13 formed therein and positioned to accept tongue 23 of the face panel 20. At the edge of the shelf opposite slot 13 is another opening 14 of generally rectangular shape into which extends a flexible tongue 16 which is integral with and lies in the plane of the shelf 11. This is clearly visible in the sectional view of FIG. 7. The shelf 11 is recessed along three edges of opening 14 to form a depression 17 below the surface of shelf 11 to facilitate the insertion and removal of the fastener 30. It is limited at the bottom by a flat planar surface 19, located a distance below the plane of the shelf 11 such that the fastener can be slid between the panel and this surface. The opening 14 and the extension 15 of opening 12 are dimensioned and spaced to respectively receive the toes 32 and 33 of card holder 30.

Figure 9:
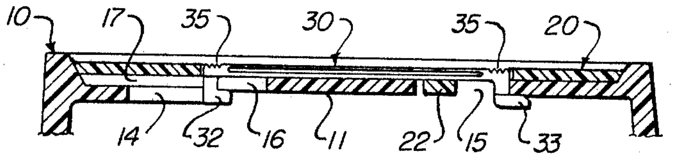
FIG. 9 is an enlarged sectional view taken on line 8—8 of FIG. 1.
Figure 10:
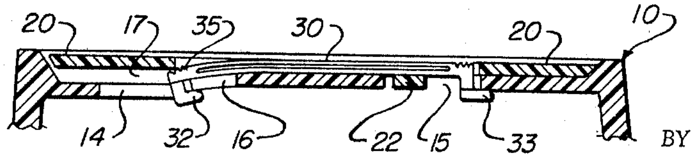
FIG. 10 is an enlarged sectional view taken on line 8—8 of FIG. 1 showing the initial step taken in removing the face panel.

The panel 20 is attached to the telephone housing 10 by first inserting the tongue 23 into the slot 13 (FIG. 6) and then bringing the panel to rest on the shelf 11. Next, the end of fastener 30 having the foot-like member 32 is inserted through the opening 21 in the panel, and upon application of a slight pressure upon the fastener, is forced down against surface 19 and to the left under the panel and into the depression 17 (FIG. 10). In this position the inserted end of the fastener is brought beyond the end of tongue 16, which is also slightly depressed. As the member 32 is inserted through the opening 14, the shoulders 36 and 37 of the fastener 30 rest on the recessed surface 19 of the opening 14, the surface 19 serving to protect the fastener as well as the tongue from excessive distortion and the possibility of permanent damage. The other end of the fastener is then brought down so that member 33 projects through the aperture 21 in the panel, to the right of bar 22, and into opening 15 in the shelf 11. To complete the operation, the fastener is moved to the right, allowing the depressed end of the fastener to come up from below the face panel, simultaneously causing member 32 to engage tongue 16 at one end and member 33 to engage the under surface of the shelf 11 at the other end. FIGS. 9 and 10 show in cross-section the assembled relationship of the fastener 30, panel 20 and housing 10. The fastener in this position is latched to the housing by members 32 and 33, which restrain it from movement away from the panel, and by shelf 11 which maintains a tension on the fastener. The panel 20 is now firmly held against the shelf 11 by the pressure exerted by the fastener 30 on bar 22 and by the tongue 23 in the slot 13.

Removal of the panel is accomplished by simply reversing the process above-described of affixing the panel to the unit. The tongue 16 is bent down by the application of a light finger pressure on the left end of the fastener to depress it below the surface of the panel and allow it to be slid under the panel 20 into the cavity 17 to release engaging members 32 and 33.

From the foregoing description it can be seen that the fastener of the present invention when inserted into the rectangular slot 21 has its surface flush with the surface of the panel, thus eliminating undesirable projections or visible fastening means, as well as providing an effective means for holding changeable designation strips and eliminating the need for special tools for assembly or disassembly of the front portion of the telephone.

While the principles of the invention have been described in connection with a specific apparatus, it is to be understood that this description is by way of example and is not intended as a limitation of the scope of the invention except as such limitations appear in the appended claims.

What is claimed is:

1. A telephone set comprising, in combination:

a housing having a cradle and a recessed shelf therein for receiving a face panel, said shelf sloping down and away from said cradle towards the front portion of the housing, said shelf having first and second openings therein and including a resilient tongue projecting into said first opening from an edge near said second opening;

a face panel having a rectangular opening therethrough for receiving a fastener, said opening having a bar thereacross disposed perpendicular to a line between said first and second openings in said shelf, said panel supported on said shelf with the rectangular opening therein overlying said first and second shelf openings; and a planar resilient fastener received within said panel opening and having first and second engaging members respectively depending from each end of said fastener and extending through said first and said second shelf openings, respectively, said first member engaging said resilient tongue in said first shelf opening and said second member engaging an edge of the shelf in said second opening to releasably latch said fastener to said shelf to thereby secure said panel to said shelf by restraining said bar.

2. A telephone set as claimed in claim 1 wherein the well formed by said recessed shelf in said housing has a slot in the wall thereof, and said panel has a tongue extending from an edge thereof and received in said slot.

3. A telephone set as claimed in claim 1 wherein said fastener is formed of transparent material and includes a slot between the planar top and bottom surfaces thereof for receiving a designation card, said slot being open along the two long edges of the fastener to thereby provide for easy interchangeability of designation cards.

4. A telephone set as claimed in claim 3 wherein each of said first and said second engaging members of said fastener is foot-like in shape and depend from the bottom surface of said fastener with the toes of both facing in the same direction parallel with the longer edges of the fastener.

5. A telephone set comprising, in combination:

a housing including a cradle portion and a shelf, sloping down and away from said cradle towards the front portion of the housing with a wall surrounding said shelf, and a slot in the wall located in the front portion of the housing, said shelf having first and second substantially rectangular openings in the surface thereof adjacent to said cradle with portions of said openings aligned approximately parallel to said cradle, a resilient tongue projecting into said first opening from an edge thereof near said second opening, and recessed shoulders parallel to said tongue;

a face panel with a rectangular opening therethrough for receiving a fastener, said opening having a bar thereacross disposed perpendicular to a horizontal line between said first and second openings in said shelf, said panel further having a tongue projecting from an edge thereof and supported on said shelf with said tongue inserted in said slot in said wall and with said rectangular opening overlying said aligned portions of said first and second shelf openings;

a planar resilient fastener received within said panel opening and having first and second engaging members respectively depending from each end of said fastener and extending through the aligned portions of said first and said second shelf openings, respectively, said first member engaging said resilient tongue in said portion of said first shelf opening and said second member engaging an edge of the shelf in said portion of said second opening to releasably latch said fastener to said shelf to thereby secure said panel to said shelf by restraining said bar, said fastener having a slot between its planar top and bottom surfaces for receiving a designation card;

said fastener being disengageable by the application of finger pressure to the end of the fastener which engages the tongue of said shelf to thereby depress said fastener and said tongue to cause the bottom surface of the fastener to rest on said shoulders of said shelf, whereupon the fastener may be slid away from said tongue into the cavity between the recessed shoulders of the shelf and the panel to disengage said engaging members from said tongue and from the edge of said portion of said second opening in said shelf.

6. A telephone set as claimed in claim 5 wherein said fastener further includes:

a plurality of grooves at each end in the top surface of said fastener, said grooves providing a slip-free area for the fingers in attaching and removing said fastener.

References Cited

UNITED STATES PATENTS

| | | |
|---|---|---|
| 3,395,257 | 7/1968 | Clark et al. |
| 3,316,357 | 4/1967 | Ham et al. |

KATHLEEN H. CLAFFY, Primary Examiner

T. W. BROWN, Assistant Examiner

U.S. Cl. X.R.

179—100